United States Patent Office 2,750,871
Patented June 19, 1956

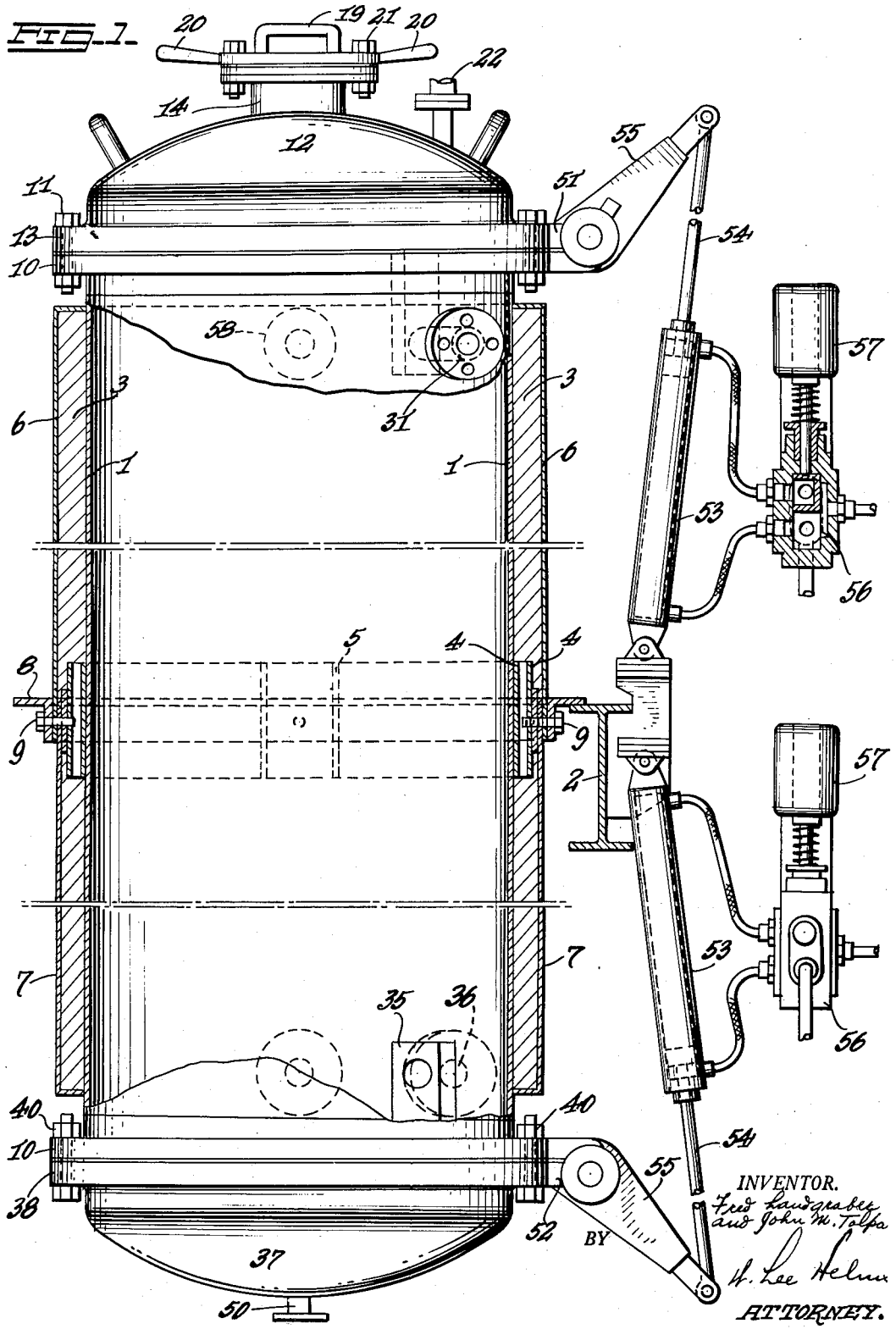

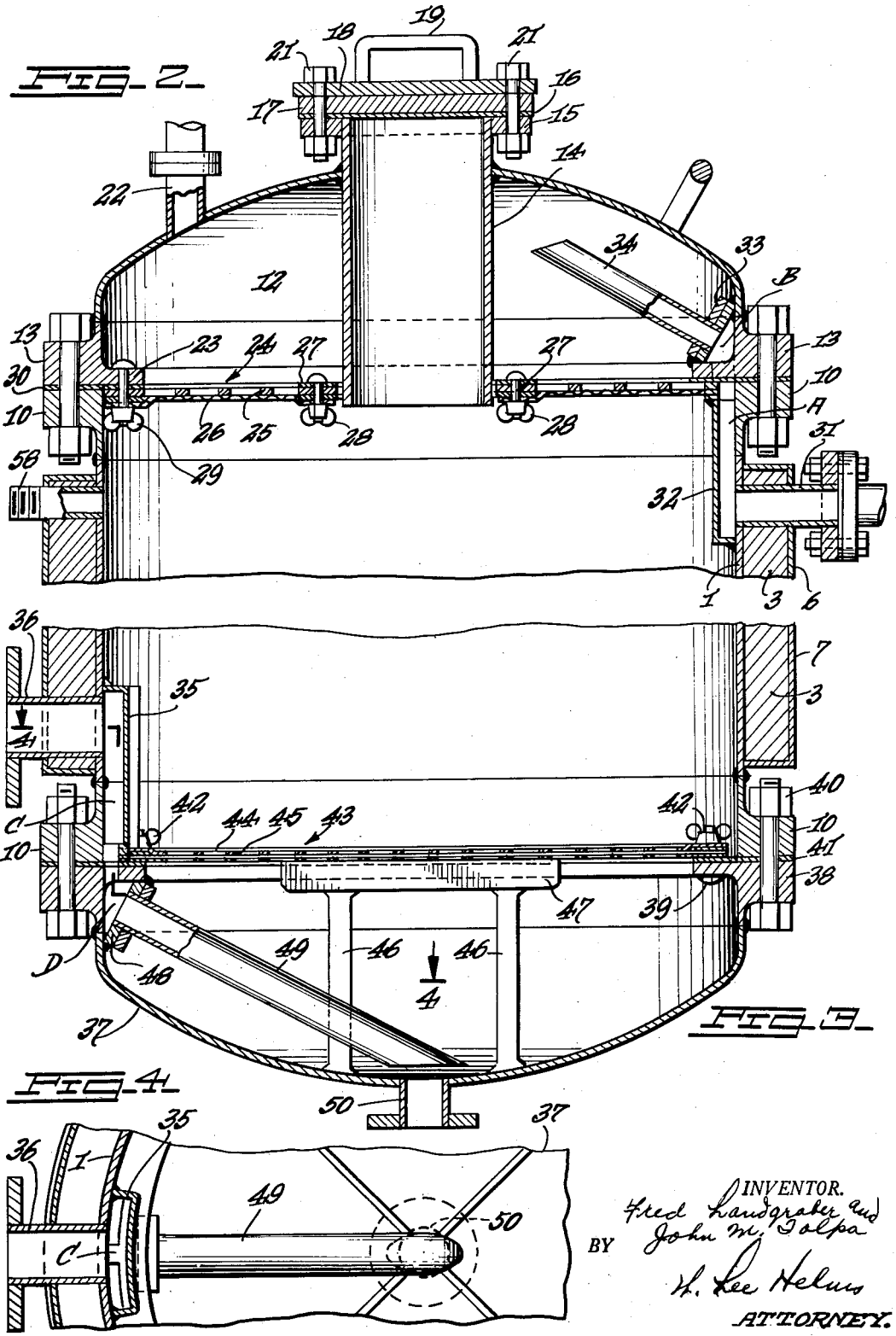

2,750,871

EXTRACTOR

Fred A. Landgraber, Sr., Bloomfield, and John M. Tolpa, Fair Lawn, N. J., assignors to Tolan Machinery Co., Inc., Port Newark, N. J., a corporation of New Jersey Application October 15, 1953, Serial No. 386,292

2 Claims. (Cl. 99—302)

This invention relates to an extractor for extracting comminuted solid material with a liquid or vaporous solvent.

It is a primary object of this invention to provide an extractor having a permanent piping hook-up thereon for introducing solvent and removing liquid extract therefrom.

It is a further object of this invention to provide an apparatus for extracting ground coffee with hot water heated beyond the boiling point of said water.

It is another object of this invention to provide a pressure extacting apparatus having a hinged dome at both the top and the bottom thereof.

It is another object of this invention to provide means for introducing the solvent into a vertically disposed container wall and thence into the top dome of said extractor.

It is still another object of this invention to provide means for removing liquid extract from a bottom dome and thence through a vertically disposed wall of the container.

These and other objects of this invention will become apparent to those skilled in the art upon reading the following disclosure taken in conjunction with the accompanying drawings in which:

Fig. 1 is a vertical side view broken way in part and partly in section showing the manner of vertically supporting the vertically disposed container and showing the means for simultaneously opening the top and the bottom domes disposed on said container, Fig. 2 is a vertical section of the extractor broken away in part and taken through the top dome and showing the manner of introducing solvent into said top dome, Fig. 3 is a vertical section through the extractor taken through the bottom dome and showing the manner of removing liquid extract from the bottom dome and through the vertically disposed container wall, and Fig. 4 is a view taken substantially on line 4—4 of Fig. 3 and showing the manner of removing the liquid extract from the center of the bottom dome and through the vertically disposed wall of the container.

Referring to the drawings, a vertical tubular container or vessel 1 is preferably disposed between two floor levels and supported on I beams 2. The vertical container walls 1 preferably are of cylindrical shape and are surrounded by insulating material, said insulating material preferably being made from glass wool 3 or equivalent insulating material. A pair of annular collars 4 are disposed about the mid-section of the vertically disposed container and secured thereto by welding or other conventional means. These collars 4 are held in spaced-apart relationship by a plurality of spacers 5 shown in dotted lines in Fig. 1. A top steel jacket 6 and a bottom steel jacket 7 are disposed about the insulating material 3 of said container in overlapping relationship. A circular L-shaped ledge 8 is secured to the overlapped exterior jackets by means of a plurality of bolts 9. The underside of said ledge is adapted to engage a plurality of I beams 2 so that the entire weight of the container and its charge of comminuted material, for example ground coffee or vanilla beans and the like, is supported on said I beams 2.

The container wall 1 is provided at its top and bottom with a circumferential flange 10 having a plurality of spaced-apart apertures therein adapted to receive nut and bolt assemblies 11.

A top outwardly dished dome 12 having a flange 13 having a plurality of apertures adapted to mate with the apertures in flange 10 is disposed over said flange 10. The dome is provided with a cylindrical charging chute 14, said chute 14 being disposed through the dome top. The top of said dome is provided with a flange 15 having a plurality of apertures therein. A gasket 16 having a plurality of apertures therein adapted to mate with the apertures of flange 15 is disposed over flange 15. A securing plate 17 also having a plurality of matable apertures is disposed over said gasket 16, and lastly, a removable top plate 18 having a top U-shaped handle 19 and a pair of radial handles 20 and provided with a plurality of apertures is disposed over plate 17 and nut and bolt assemblies 21 are disposed through all of the apertures of said elements 15, 16, 17 and 18.

Charging chute 14 may be opened at the top by disengaging the securing action of nut and bolt assemblies 21 and the cylindrical container may be charged with a mass of comminuted material to be extracted. The dome 12 is provided with a safety valve conduit 22, and a safety valve of conventional means (not shown) is secured to said conduit 22. The interior of the dome 12 is provided with an inwardly disposed circular ledge 23 having a plurality of apertures therein. A top screen assembly 24 consisting of a top perforated spacer plate 25 and a bottom screen 26 and an inner ring 27 disposed about said discharge 14, is secured together by a plurality of wing nuts 28.

The top screen assembly 24 is secured to the ledge 23 of the dome 12 by means of a plurality of wing assemblies 29. A circular gasket 30 having a plurality of apertures therein is disposed between container flange 10 and dome flange 13 to effect a pressuretight seal. The gasket 30 may be of stainless steel, of soft asbestos covered with stainless steel foil, or hard asbestos. The function of the top screen assembly 24 is to prevent ground comminuted material, for example ground coffee, from entering into the dome chamber provided by dome 12.

In the operation of the extractor, for example 600 pounds of extractable ground coffee is treated with about 165 gallons of hot water having a temperature of 320° F. and a pressure of about 125 pounds. The heat used in the operation of the extracting process causes the vessel to expand and the resultant expansive movement is translated into linear movement of ledge 8 upon I beam 2.

Referring to Fig. 2 a conduit 31 for introducing steam or liquid above the boiling point thereof is disposed through the container wall 1 at a point in close spaced relationship to the top flange 10. Disposed interiorly of said container wall 1 and about the orifice of said superheated fluid conduit 31 is a baffle plate 32. The baffle plate 32 is disposed in spaced-apart relationship to the container wall 1 and is welded thereto, forming a fluid-tight seal at the points of welding, thereby forming an enclosure A having an open trough-like aperture adajcent the top edge of the container and interiorly of the flange 10.

The top dome 12 has an aperture through the ledge 23 adapted to communicate with the trough-like aperture of the enclosure A. A top dome baffle plate 33 disposed at an inclined angle of about 45° is disposed over the aperture of said ledge 23 and welded to the dome and the ledge 23 to form a triangular chamber B. The top dome baffle plate 33 is provided with an aperture and a tubular conduit 34 is disposed about said aperture in baffle plate 33 with the top of the conduit 34 being directed toward the interior top of the dome 12.

A superheated solvent, for example water at 320° F., is introduced into the extractor through conduit 31 and thence into enclosure A, whereupon the liquid is propelled into triangular chamber B and thence through conduit 34 toward the interior of the dome 12, whereupon the hot liquid is dispersed substantially uniformly over the entire screen assembly 24.

The bottom of the container wall 1 is provided with a bottom baffle plate 35 disposed preferably in diametrically opposed relationship to baffle plate 32 and in spaced relationship to the edge of the bottom of container 1. The baffle plate 35 is disposed in spaced-apart relationship to the container wall 1, forming an enclosure C. The baffle plate 35 is welded to the interior surface of the container 1, forming a liquid-tight seal thereto. A conduit 36 for removing liquid extract from the extractor is disposed through container wall 1 and about an aperture provided therefor communicating with the enclosure C.

The bottom of the extractor is provided with a bottom dome 37 having an outwardly dished configuration. The bottom dome 37 is provided with an outwardly disposed flange 38 having an inwardly disposed flange 39 integral thereto. The flange 38 is provided with a plurality of apertures, which apertures communicate with similar apertures disposed in the bottom flange 10 of the tubular body portion container 1. Nut and bolt assemblies 40 secure flange 10 to flange 38 with a gasket 41 disposed therebetween to prevent seepage of liquid from the interior of the extractor. The interiorly disposed ledge 39 is provided with a plurality of apertures adapted to engage wing nuts 42.

A bottom screen assembly 43 preferably made from a plurality of screens 44 having perforated plates 45 therebetween is disposed on top of the gasket 41 and interiorly of the container 1. The bottom screen assembly 43 is of circular configuration having a plurality of apertures adjacent the circumference adapted to receive wing nuts 42.

It will be seen that because of the securing of the screen assembly 43 to the ledge 39 of the dome that the screen moves with the dome 37 as a unit when the dome is swung downwardly and away from the container body 1. A plurality of normally vertical supports 46 are secured to the interior of the dome 37 and are provided at their top with a support plate 47 adapted to engage the underside of screen assembly 43. It is thus apparent that the weight of the charge of the comminuted material in the extractor disposed upon the screen assembly 43 is in part supported by the support plate 47.

The bottom dome ledge 39 is provided with aperture disposed over the opening of the enclosure C. A bottom dome apertured bevel plate 48 is disposed over the aperture in ledge 39 communicating with the enclosure C forming a triangular chamber D having fluid-tight welded seams. A tubular conduit 49 is disposed about the aperture in bottom dome baffle plate 48. The conduit 49 is therefore angularly disposed with the bottom opening thereof being located over the bottom apex of dome 37. It is apparent therefore that the fluid extract in bottom dome 37 may be removed by means of suction applied at conduit 36, the fluid extract being transported through conduit 49 into chamber D and thence into enclosure C and finally out through conduit 36. The construction of the angularly disposed pipe 49 and the chamber D with enclosure C communicating therewith and conduit 36 communicating with said enclosure C is substantially identical to the construction used for introducing the superheated liquid into enclosure A and thence into chamber B.

The apex of the bottom element 37 is provided with a conduit 50 leading to a valve (not shown). The purpose of conduit 50 and the valve secured thereto is to remove samples of liquid from the extract in order to evaluate the efficiency of the extracting process.

Turning to Fig. 1, there is shown a mechanism for simultaneously opening the bottom dome 37 with the top dome 12. In order to effect this result, the top flange 13 and the bottom flange 38 are hinged to the body member in any suitable manner and are provided with projections 51 and 52 respectively. A pair of hydraulic cylinders 53 having piston rods 54 communicate with lever crank arms 55 which crank arms 55 are fixedly secured to the projections 51 and 52. The hydraulic cylinders 53 are operated through fluid valves 56, which valves are in turn operated by electrically actuated solenoids 57. In the embodiment shown in the drawings the projections 51 for the top dome 12 and 52 for the bottom dome-like closure and the crank arms are connected to the body member flange by pivot studs, these being common forms of pivot hinges and which do not require detailed description. It is thus apparent that by a mere actuation of an electrical switch both solenoids 57 can be simultaneously actuated to operate the corresponding hydraulic valves 56, thereby causing both the top and the bottom hydraulic cylinders 53 to operate causing the cylinder rods 54 to move inwardly with the result that the domes 12 and 37 which have previously been unbolted from their secured relationship to the container 1 may be swung open simultaneously.

In removing the charge of spent extracted comminuted material only the bottom dome need be swung open so that the top and bottom hydraulic cylinders 53 may be operated independently of each other if so desired. When the bottom dome with its screen assembly 43 is swung open it is noted that the mass of comminuted material still clings to the container 1. In order to dislodge this spent material steam or high pressure gas may be introduced through conduit 31 and thence through enclosure A and chamber B into the interior of dome 12, whereupon the pressure formed causes the block of comminuted material to be blown out of the bottom of the vertically disposed container 1.

In recharging the extractor the bottom dome 37 is swung back into place through the use of the lower hydraulic cylinder 53 and the dome 37 is then bolted to the container 1 through a plurality of nut and bolt assemblies 40, whereupon the top plates 16, 17 and 18 disposed over the cylindrical element 14 are removed and the freshly ground coffee or other comminuted material is poured through said cylindrical tube 14. After a full charge of coffee has been introduced into the container the plates 16, 17 and 18 are bolted to collar 15 so that a fluid-tight seal is obtained over the element 14, whereupon superheated water is introduced through conduit 34 upon the newly charged material.

In order to evaluate the pressure within the extractor a conduit 58 is disposed into the container wall 1 and a pressure gauge (not shown) is secured to said conduit 58.

While this invention has been described by means of an embodiment, it will become apparent to those skilled in the art upon reading this descriptive disclosure that the location and arrangement of the enclosures A and C and chambers B and D relative thereto may possess different shapes or designs, but all these various obvious embodiments of this invention are within the inventive scope thereof and intended to be covered by the claims appearing hereinafter.

It will be seen that liquid may be introduced not only into the top dome but also alternatively into the bottom dome. Manifestly, the liquid therefore may be introduced into either the top or the bottom dome and accordingly removed from the opposed end dome. Thus if the liquid is introduced into the bottom dome it may be removed from the top dome, or vice versa.

Having described my invention, what I claim and desire to secure by Letters Patent is as follows:

1. A pressure extractor for solvent extraction of comminuted solid material comprising a body member vertically disposed for holding said comminuted material, an inlet for said body member disposed near the top thereof, an upper chamber within and adjacent the wall of the body member and communicating with said inlet, said chamber being closed except at its top, a dome-like cover for said body member adapted to be moved to closed or open position relatively to the body member, said cover having an inlet communicating with said upper chamber when the cover is closed, a distributor nozzle carried by the cover and communicating with said cover inlet, said nozzle being directed toward the axis of the cover, an outlet for the body member near its base, a lower chamber within and adjacent the wall of the body member and communicating with said outlet, said last named chamber being closed except at its base, a dished bottom for the body member adapted to be moved to closed or open position relatively to the body member, said bottom having an inlet communicating with the base of the lower chamber of the body member when the bottom is closed, a suction pipe in said bottom and communicating with said inlet and thence leading downwardly toward the lower area of said bottom, and screen means intermediate the body member and said dished removable bottom.

2. An extractor for extracting comminuted material with a solvent comprising a vertical body member, a hinged dome adapted to engage the top edge of said body member, a dished bottom adapted to engage the bottom edge of the body member, a top baffle secured interiorly to the top of said body member to form an open mouth enclosure within and about a portion of the top area of said body member, the enclosed top body wall portion having an aperture therein leading into said enclosure for introducing heated fluid solvent therein, a bottom baffle carried interiorly to the body member wall to form an open mouth enclosure within and about an area of the bottom of said body member as a withdrawal member for fluid extract, said top dome having an interiorly disposed ledge having an aperture therethrough for communicating with said open mouth of said top baffle, a tubular nozzle member disposed in said dome baffle and directed toward the apex of said top dome, said bottom having a passage communicating with said open mouth of said bottom baffle of the body member, and a tubular conduit carried by said bottom member and adapted for registration with the aperture of said bottom baffle of said body member and directed interiorly toward the apex of said bottom member.

References Cited in the file of this patent

UNITED STATES PATENTS

| | | |
|---|---|---|
| 373,420 | Suits | Nov. 15, 1887 |
| 918,765 | Miller | Apr. 20, 1909 |
| 1,075,727 | Reichert | Oct. 14, 1913 |
| 1,187,419 | Duke | June 13, 1916 |
| 1,344,102 | Thorold | June 22, 1920 |
| 1,535,769 | Gallardo | Apr. 28, 1925 |
| 2,139,881 | Comstock | Dec. 13, 1938 |
| 2,273,037 | Hothersall | Feb. 17, 1942 |
| 2,398,314 | Laereman | Apr. 9, 1946 |
| 2,447,692 | Evensen | Aug. 24, 1948 |
| 2,578,179 | Doyle | Dec. 11, 1951 |
| 2,644,758 | Cross | July 7, 1953 |

FOREIGN PATENTS

| | | |
|---|---|---|
| 27,602 | Great Britain | A. D. 1902 |